(12) United States Patent
Beale et al.

(10) Patent No.: US 10,461,909 B2
(45) Date of Patent: Oct. 29, 2019

(54) INFRASTRUCTURE EQUIPMENT, COMMUNICATIONS DEVICE AND METHODS

(71) Applicant: SONY CORPORATION, Tokyo (JP)

(72) Inventors: Martin Warwick Beale, Basingstoke (GB); Brian Alexander Martin, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 15/553,470

(22) PCT Filed: Mar. 8, 2016

(86) PCT No.: PCT/EP2016/054922
§ 371 (c)(1),
(2) Date: Aug. 24, 2017

(87) PCT Pub. No.: WO2016/162158
PCT Pub. Date: Oct. 13, 2016

(65) Prior Publication Data
US 2018/0248667 A1     Aug. 30, 2018

(30) Foreign Application Priority Data
Apr. 10, 2015    (EP) .................................... 15163288

(51) Int. Cl.
*H04L 5/00* (2006.01)
*H04B 7/06* (2006.01)
(Continued)

(52) U.S. Cl.
CPC ......... *H04L 5/0053* (2013.01); *H04B 7/0617* (2013.01); *H04L 5/0023* (2013.01);
(Continued)

(58) Field of Classification Search
CPC ..... H04L 5/0053; H04L 25/02; H04L 5/0023; H04L 5/0091; H04W 72/0453; H04W 84/042; H04B 7/0617
See application file for complete search history.

(56) References Cited

U.S. PATENT DOCUMENTS

2010/0272032 A1* 10/2010 Sayana ................. H04B 7/024
370/329
2012/0202555 A1* 8/2012 Bergman ............. H04B 7/0413
455/522

(Continued)

FOREIGN PATENT DOCUMENTS

WO    WO-2016162158 A1 * 10/2016 ........... H04B 7/0617

OTHER PUBLICATIONS

International Search Report dated May 24, 2016, in PCT/EP2016/054922 filed Mar. 8, 2016.
(Continued)

*Primary Examiner* — Walli Z Butt
(74) *Attorney, Agent, or Firm* — Xsensus LLP

(57) ABSTRACT

An infrastructure equipment for a mobile communications network, including: a transmitter configured to transmit signals to one or more terminal devices via a wireless access interface including a plurality of antenna ports, and a controller configured to control the transmitter to transmit the signals to the one or more terminal devices. The transmitter is configured to transmit a plurality of physical resource blocks to the one or more communications devices. A same beamforming weight vector is applied to one of the antenna ports for at least a subset of the plurality of physical resource blocks.

20 Claims, 11 Drawing Sheets

(51) Int. Cl.
*H04W 72/04* (2009.01)
*H04L 25/02* (2006.01)
*H04W 84/04* (2009.01)

(52) U.S. Cl.
CPC ............ *H04L 5/0091* (2013.01); *H04L 25/02* (2013.01); *H04W 72/0453* (2013.01); *H04W 84/042* (2013.01)

(56) References Cited

U.S. PATENT DOCUMENTS

| | | |
|---|---|---|
| 2013/0039291 A1 | 2/2013 | Blankenship et al. |
| 2013/0044727 A1* | 2/2013 | Nory ................. H04L 5/0092 370/330 |
| 2013/0114522 A1* | 5/2013 | Frenne ............... H04L 5/0094 370/329 |
| 2017/0047977 A1* | 2/2017 | Kim ........................ H04B 7/10 |
| 2017/0250747 A1* | 8/2017 | Reinhardt ............ H04B 7/0617 |
| 2018/0049192 A1* | 2/2018 | Beale ................ H04W 72/0446 |

OTHER PUBLICATIONS

Harri Holma et al., "LTE for UMTS OFDMA and SC-FDMA Based Radio Access", Wiley 2009, ISBN 978-0-470-99401-6, 4 pages (Summary Only).

Sigen YE et al., "Enhanced Physical Downlink Control Channel in LTE Advanced Release 11", IEE Communications Magazine, Feb. 2013, vol. 51, Issue: 2, 3 pages (Summary Only).

"3$^{rd}$ Generation Partnership Project; Technical Specification Group Radio Access Network; Evolved Universal Terrestrial Radio Access (E-UTRA); Physical channels and modulation (Release 12)", 3GPP TS 36.211, V12.4.0, Technical Specification, Dec. 2014, 124 pages.

"3$^{rd}$ Generation Partnership Project; Technical Specification Group Radio Access Network; Evolved Universal Terrestrial Radio Access (E-UTRA);Physical layer procedures (Release 12)", 3GPP TS 36.213, V12.5.0, Technical Specification, Mar. 2015, 239 pages.

"3$^{rd}$ Generation Partnership Project; Technical Specification Group Radio Access Network; Study on provision of low-cost Machine-Type Communications (MTC) User Equipments (UEs) based on LTE (Release 12)", 3GPP TR 36.888, V12.0.0, Technical Report, Jun. 2013, 55 pages.

"On the Need for Transmit Diversity in ePDCCH Transmission", Texas Instruments, 3GPP TSG RAN WG1 #68bis, R1-121212, Mar. 26-30, 2012, 6 pages.

"PUSCH link performance for MTC", Ericsson, 3GPP TSG-RAN WG1 #80, Tdoc R1-150021, Feb. 9-13, 2015, 7 pages.

"Further Discussion on Reference Signals for E-PDCCH", Research in Motion, UK Limited, 3GPP TSG RAN WG1 Meeting #68, R1-120332, Feb. 6-10, 2012, 5 pages.

"Considerations on the ePDCCH design", Huawei, HiSillicon, 3GPP TSG RAN WG1 Meeting #67, R1-113655, XP050561796, Nov. 2011, 5 pages.

* cited by examiner

Localised and distributed forms of ePDCCH

Figure 2. *EREG to RE mapping for the case of the normal cyclic prefix length for a frequency-division duplex (FDD) system*

Mapping of eREGs to Res

INFRASTRUCTURE EQUIPMENT, COMMUNICATIONS DEVICE AND METHODS

BACKGROUND

Field of Disclosure

Technical Field of the Disclosure

The present disclosure relates to infrastructure equipment for mobile communications networks, communications devices configured to communicate using mobile communications networks and methods for communicating with communications devices. In some embodiments a wireless access interface provided by the mobile communications network is configured to extend a radio communications coverage by transmitting messages repeatedly to the communications devices.

Background of the Disclosure

Mobile communications system such as those which are being developed in accordance with the Long Term Evolution (LTE) project by the Third Generation Project Partnership (3GPP) can provide a facility for communications devices to transmit or receive data for a variety of applications with high data rates within a radio coverage area provided by a mobile communications network. A wireless access interface provided by the mobile communications network configured in accordance with an LTE standard includes signal transmission techniques which can support these high data rates. There is therefore expected to be a variety of applications, which can be supported by an LTE system.

Although there are applications which require high data rates to support their operation, there are some applications in which high data rates are not required. Indeed there are some applications which are expected to be provided by more simple, less complicated communications devices such as those supporting machine type communications (MTC). Such devices are also expected to be low power devices and may include a relatively inexpensive low complexity, narrowband, transmitter and receiver. Such devices may also be deployed in locations in which radio communications conditions can make transmission and reception of signals more difficult.

A technique which has been proposed to improve a likelihood of communications devices to receive signals transmitted by a mobile communications network using an existing transmission format is to repeat a transmission of a signal representing a message from a mobile communications network. A receiver can combine the repeatedly received message to improve a likelihood of correctly detecting the message. Therefore a mobile communications network can be arranged to extend its radio coverage, particularly for less complicated mobile communications devices. Such a technique is known as coverage extension.

However, the use of narrowband transmitters and receivers means that it is sometimes difficult to receive control signals from the network. It is sometimes also difficult for a terminal device to perform channel estimation for a channel that varies in time, frequency or spatially.

SUMMARY OF THE DISCLOSURE

According to the present technique, an infrastructure equipment for a mobile communications network is described. The infrastructure equipment comprising, a transmitter configured to transmit signals to one or more terminal devices via a wireless access interface comprising a plurality of antenna ports, and a controller configured to control the transmitter to transmit the signals to the one or more terminal devices, wherein the transmitter is configured to transmit a plurality of physical resource blocks to the one or more communications devices, wherein a same beamforming weight vector is applied to one of the antenna ports for at least a subset of the plurality of physical resource blocks.

Various further aspects and features of the present disclosure are defined in the appended claims and include a communications device, a method of communicating using a communications device.

BRIEF DESCRIPTION OF DRAWINGS

Embodiments of the present disclosure will now be described by way of example only with reference to the accompanying drawings wherein like parts are provided with the same reference numerals and in which.

DESCRIPTION OF EXAMPLE EMBODIMENTS

Communications System

Figure 1:
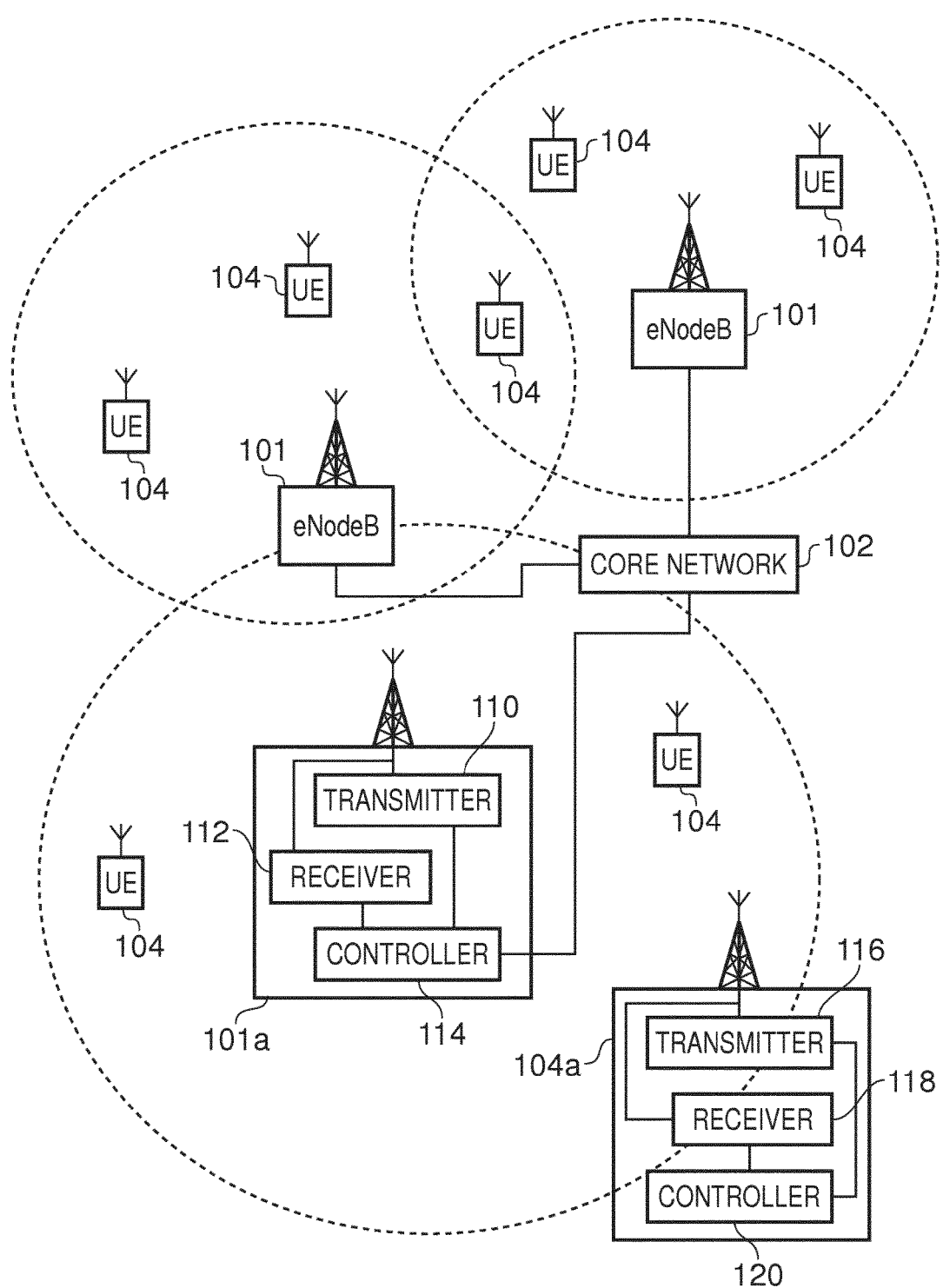
FIG. 1 provides a schematic block diagram of a mobile communications system in which communications devices are communicating via infrastructure equipment.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a mobile telecommunications system, where the system includes infrastructure equipment comprising base stations 101 which are connected to a core network 102, which operates in accordance with a conventional arrangement which will be understood by those acquainted with communications technology. The infrastructure equipment 101 may also be referred to as a base station, network element, infrastructure apparatus, enhanced Node B (eNodeB) or a coordinating entity for example, and provides a wireless access interface to the one or more communications devices within a coverage area or cell represented by a broken line 103. One or more mobile communications devices 104 may communicate data via the transmission and reception of signals representing data using the wireless access interface. The core network 102 may also provide functionality including authentication, mobility management, charging and so on for the communications devices served by the network entity.

The mobile communications devices of FIG. 1 may also be referred to as communications terminals, user equipment (UE), terminal devices and so forth, and are configured to communicate with one or more other communications devices served by the same or a different coverage area via the network entity. These communications may be performed by transmitting and receiving signals representing data using the wireless access interface over the two way communications links.

The communications system may operate in accordance with any known protocol, for instance in some examples the system may operate in accordance with a 3GPP Long Term Evolution (LTE) standard.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 103. A controller 114 controls the transmitter 110 and the receiver 112 to transmit and receive the signals via the wireless access interface. The controller 114 may perform a function of controlling the allocation of communications resource elements of the wireless access interface and may in some examples include a scheduler for scheduling transmissions via the wireless access interface for both an uplink and the downlink.

An example UE 104a is shown in more detail to include a transmitter 116 for transmitting signals on the uplink of the wireless access interface to the eNodeB 103 and a receiver 118 for receiving signals transmitted by the base station 101 on the downlink via the wireless access interface. The transmitter 116 and the receiver 118 are controlled by a controller 120.

LTE Wireless Access Interface

Mobile telecommunications systems such as those arranged in accordance with the 3GPP defined Long Term Evolution (LTE) architecture use an orthogonal frequency division modulation (OFDM) based wireless access interface for the radio downlink (so-called OFDMA) and a single carrier frequency division multiple access scheme (SC-FDMA) on the radio uplink. The down-link and the up-link of a wireless access interface according to an LTE standard is presented in FIGS. 2 and 3.

Figure 2:
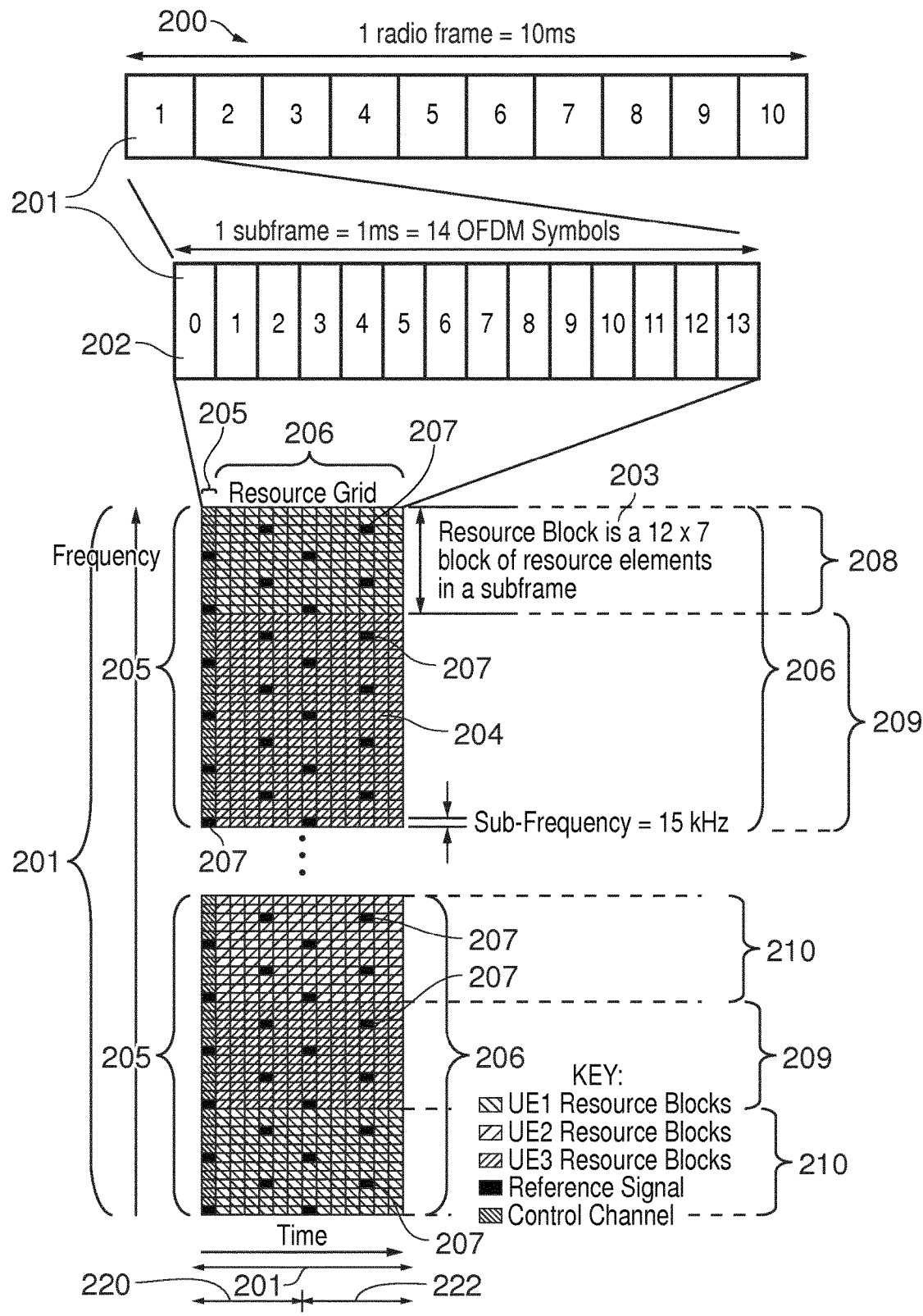
FIG. 2 provides a schematic diagram of a structure of a downlink of a wireless access interface of a mobile communications system operating according to an LTE standard.

FIG. 2 provides a simplified schematic diagram of the structure of a downlink of a wireless access interface that may be provided by or in association with the base station of FIG. 1 when the communications system is operating in accordance with the LTE standard. In LTE systems the wireless access interface of the downlink from a base station to a UE is based upon an orthogonal frequency division multiplexing (OFDM) access radio interface. In an OFDM interface the resources of the available bandwidth are divided in frequency into a plurality of orthogonal subcarriers and data is transmitted in parallel on a plurality of orthogonal subcarriers, where bandwidths between 1.4 MHZ and 20 MHz bandwidth may be divided into orthogonal subcarriers. Not all of these subcarriers are used to transmit data (some are used for features such as the cyclic prefix of the OFDM symbols). The number of subcarriers varies between 72 subcarriers (1.4 MHz) and 1200 subcarriers (20 MHz). In some examples the subcarriers are grouped on a basis of $2^n$, for example 128 to 2048, so that both a transmitter and a receiver can use an inverse and a forward Fast Fourier Transform to convert the sub-carriers from the frequency domain to the time domain and from the time domain to the frequency domain respectively. Each subcarrier bandwidth may take any value but in LTE it is fixed at 15 kHz. As shown in FIG. 2, the resources of the wireless access interface are also temporally divided into frames where a frame 200 lasts 10 ms and is subdivided into 10 subframes 201 each with a duration of 1 ms. Each subframe 201 is formed from 14 OFDM symbols and is divided into two slots 220, 222 each of which comprise six or seven OFDM symbols depending on whether a normal or extended cyclic prefix is being utilised between OFDM symbols for the reduction of inter symbol interference. The resources within a slot may be divided into resources blocks 203 each comprising 12 subcarriers for the duration of one slot and the resources blocks further divided into resource elements 204 which span one subcarrier for one OFDM symbol, where each rectangle 204 represents a resource element. More details of the down-link structure of the LTE wireless access interface are provided in Annex 1. However of particular relevance in understanding the example embodiments of the present technique are the downlink control channel referred to as the physical downlink control channel (PDCCH) and a shared channel of resources for transmitting data to UEs which is the physical downlink shared channel (PDSCH).

Figure 3:
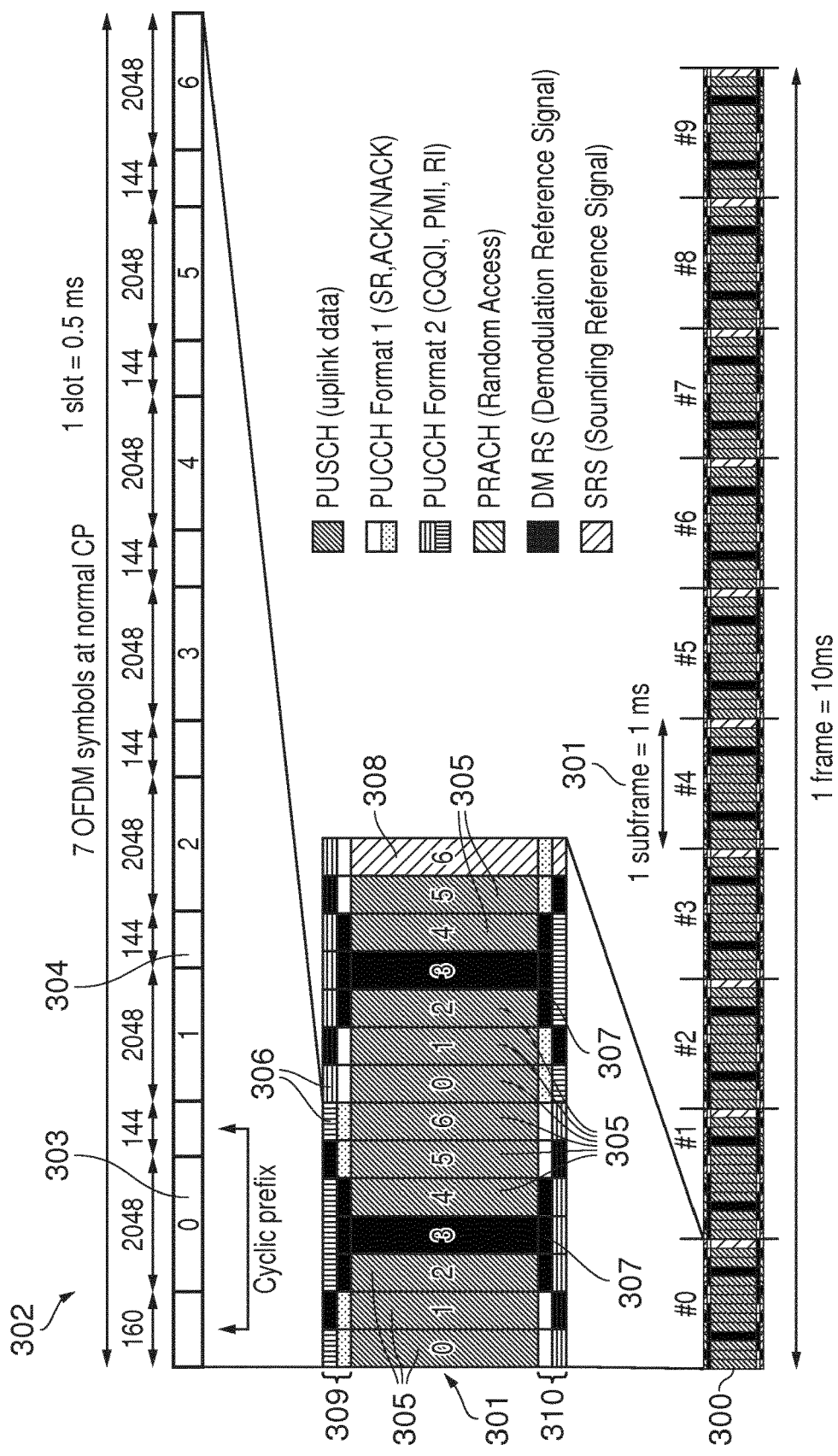
FIG. 3 provides a schematic diagram of an uplink of a wireless access interface of a mobile communications system operating according to an LTE standard.

FIG. 3 provides a simplified schematic diagram of the structure of an uplink of an LTE wireless access interface that may be provided by or in association with the base station of FIG. 1. In LTE networks the uplink wireless access interface is based upon a single carrier frequency division multiplexing FDM (SC-FDM) interface and downlink and uplink wireless access interfaces may be provided by frequency division duplexing (FDD) or time division duplexing (TDD), where in TDD implementations subframes switch between uplink and downlink subframes in accordance with predefined patterns. However, regardless of the form of duplexing used, a common uplink frame structure is utilised. The simplified structure of FIG. 3 illustrates such an uplink frame in an FDD implementation. A frame 300 is divided in to 10 subframes 301 of 1 ms duration where each subframe 301 comprises two slots 302 of 0.5 ms duration. Each slot is then formed from seven OFDM symbols 303 where a cyclic prefix 304 is inserted between each symbol in a manner equivalent to that in downlink subframes. More details of the LTE up-link represented in FIG. 3 are provided in Annex 1.

Channel Estimation Using a Narrowband Receiver

The LTE data or datagram is transmitted on the PDSCH on the downlink and on the PUSCH in the uplink. The resources on the PDSCH and the PUSCH are allocated to the terminal device by the base station. Prior to 3GPP Rel-11, the PDCCH was used to allocate these channels. From Rel-11, it has also been possible to allocate these channels using an enhanced PDCCH (ePDCCH). The ePDCCH supports beamforming, but does not support transmit diversity schemes that are supported by PDCCH (Alamouti-style transmit diversity). Transmit diversity is useful to combat multipath fading. In order to decode a downlink signal reliably, the terminal device typically performs channel estimation. By having knowledge of the channel between the base station and the terminal device, the terminal device is able to take into account the likely deformation of the signal by the channel and with this a-priori knowledge, more reliably decode the received signal. Embodiments of the present technique find applications in which the terminal device can perform channel estimation between physical resource blocks with a narrowband receiver.

ePDCCH Structure

Figure 4:
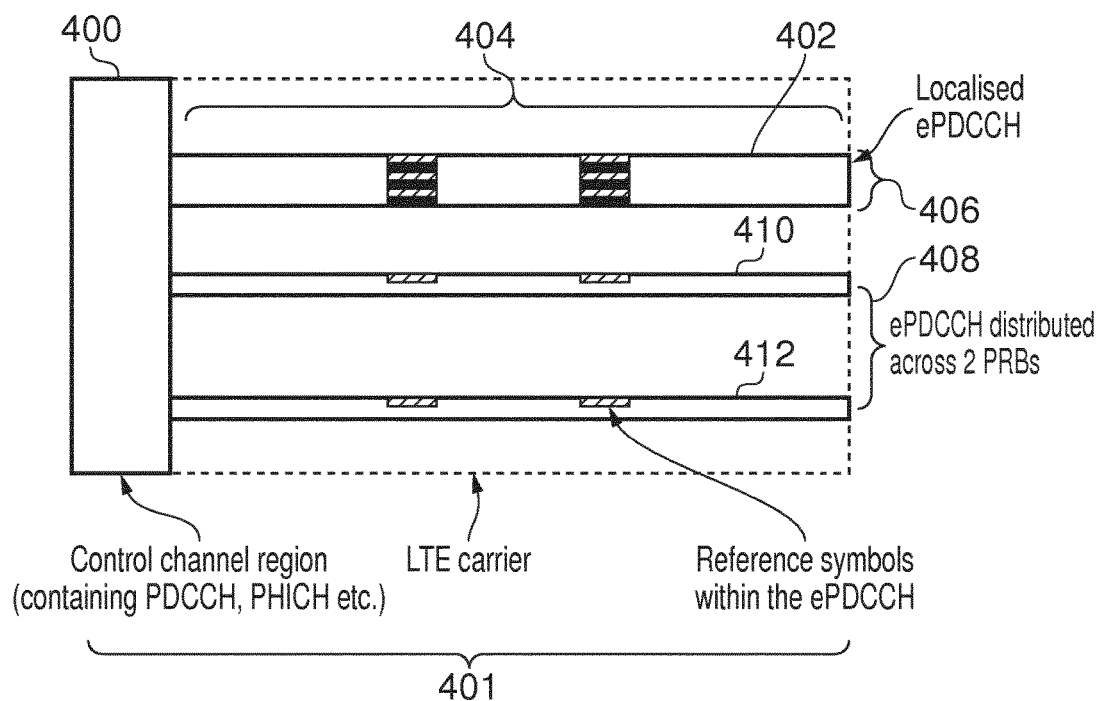
FIG. 4 is a schematic representation of a subframe of a wireless access interface, which includes a localised ePDCCH and a distributed ePDCCH.

FIG. 4 provides a schematic representation of a subframe in which an ePDCCH forms part of a wireless access interface according to an LTE standard. As shown in FIG. 4 a conventional control channel region 400 is shown within a subframe 401 which is transmitted in the first of the 1 to 3 OFDM symbols of the subframe 401. This example control channel corresponds to a conventional PDCCH 400 and is transmitted across the available bandwidth of the wireless access interface. In contrast, a localised enhanced PDCCH 402 is transmitted in time across the remaining part of the subframe 404 within a narrow band of frequency sub-carriers 406. An alternative example of an ePDCCH 408 comprises a first part 410 transmitted across a first group of frequencies and a second part 412 transmitted in the second group of frequencies so that the ePDCCH is distributed across two physical resource blocks.

As noted above, a wireless access interface according to an LTE standard provides for the transmission of non-access stratum data, such as user data, on the PDSCH on the downlink and on the PUSCH in the uplink. Communications resource elements on the PDSCH and PUSCH are allocated to the UE by the base station. Prior to 3GPP Release-11, the PDCCH was used to allocate these channels. From Release-11, it has also been possible to allocate these channels using an enhanced PDCCH (the ePDCCH). Therefore, effectively for the example shown in FIG. 4, the same control channel information can be transmitted on the PDCCH 400 or on the ePDCCH 402, 408 for either of the arrangements of the control channel arrangements shown in FIG. 4.

As can be appreciated from FIG. 4, the ePDCCH is essentially a narrowband control channel. As shown in FIG. 4, the ePDCCH can be transmitted in either a localized mode as shown for the first example 402 or in a distributed mode as shown for the second example 408. For the example of a localised mode of allocation, the ePDCCH can occupy a single PRB (physical resource block=12 OFDM subcarriers). It can also occupy a contiguous set of plural PRBs. When the base station (eNodeB) has knowledge about the channel conditions of the terminal device (UE), it can choose a physical resource block (PRB) that has particularly favourable channel conditions for the terminal device (e.g. avoiding fades). The base station can also choose a beamforming codebook entry to produce a beam that is targeted at that terminal device.

In a distributed mode of allocation, the ePDCCH occupies at least two PRBs. This mode of allocation is preferable when the base station does not have measurements or an indication representing radio channel conditions at the terminal device. This might occur for example if the terminal device is operating at a high speed, such that, for example, feedback from the terminal device is out of date when it arrives at the base station, or a dedicated beam from the base station cannot track a terminal device's position quickly enough, or when feedback from the terminal device is intermittent, for example when the UE is operating with a low data rate bursty traffic model.

Figure 5:
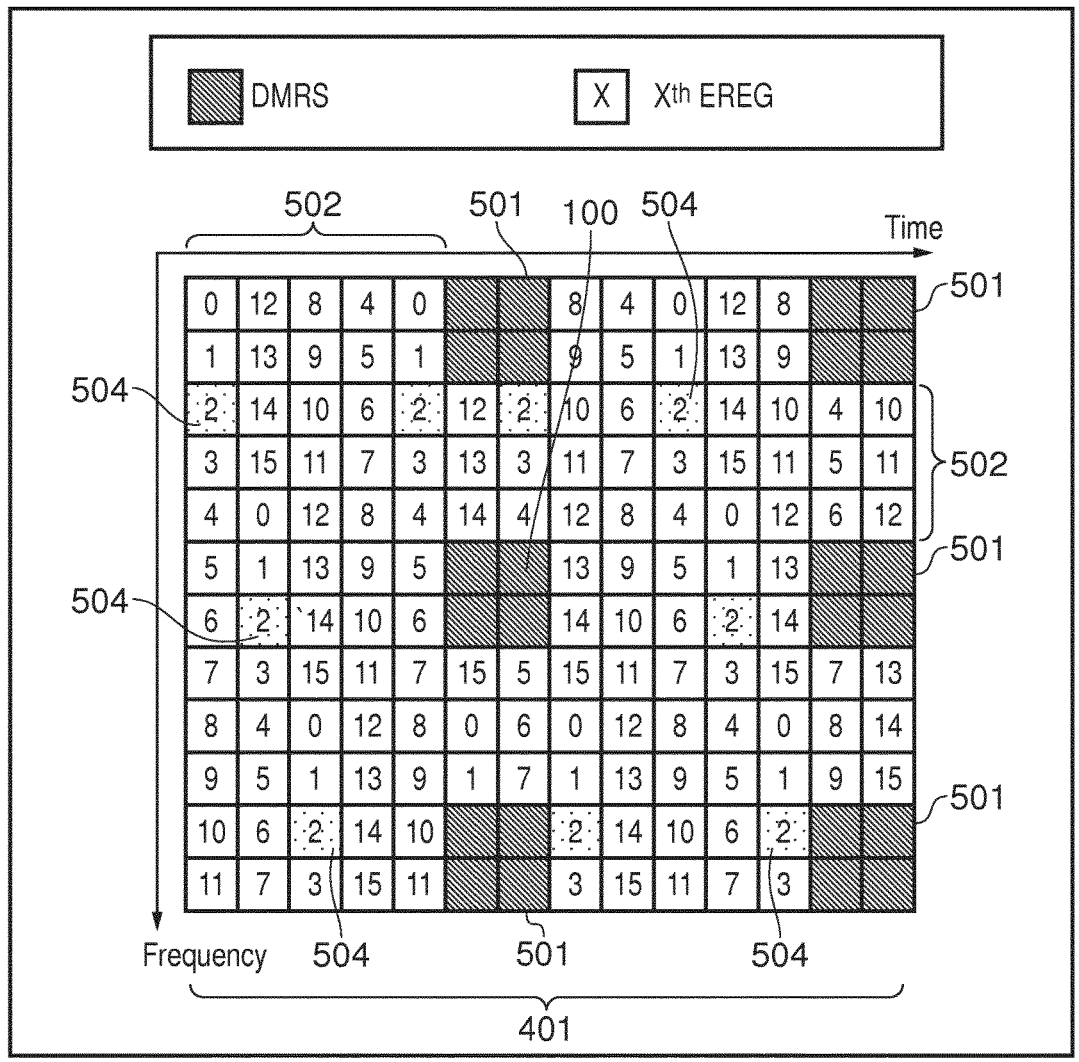
FIG. 5 is a schematic representation of a subframe, which illustrates a mapping of enhanced resource element groups for different purposes.

FIG. 5 provides a schematic representation of a mapping of enhanced resource element groups provided within a subframe 400, which can be found in [2] In FIG. 5 a mapping between enhanced resource element groups (EREGs) and resource elements (REs) is shown for a frequency division duplex arrangement. Resource elements which are dedicated for transmitting demodulation reference symbols (DMRS) 501 are shown as dark shaded blocks, whereas non-shade elements numbered 0 to 15 502 are allocated for transmission of data or control messages to terminal devices. Lightly shaded elements 504 numbered 2 are nine resource elements all belonging to enhanced resource element group EREG 2.

An allocation message on an ePDCCH is physically transmitted using ECCEs (enhanced control channel element). An ECCE is comprised of four or eight EREG (usually four EREG). The number of ECCE used in the ePDCCH can depend on channel conditions (in poor channel conditions, more ECCEs are used to form the ePDCCH in order to provide greater redundancy and hence more resilience). An example ePDCCH might use two ECCEs where each ECCE comprises 4 EREG. In this case a total of 8 EREG are used. Hence the ePDCCH in question would comprise all those RE 504 in FIG. 5 that are numbered between 0 and 7 (inclusive). FIG. 5 is particularly applicable to localized modes of transmission.

When a distributed mode of allocation is used, the EREG that comprise an ECCE are taken from different PRB (hence the ePDCCH is comprised of resource elements that come from more than one PRB: more than one frequency location). Every alternate resource element that comprises an ePDCCH is associated with the same antenna port. For example, the first, third, fifth etc. enumerated resource elements are associated with a first antenna port and the second, fourth, sixth etc. enumerated resource elements are associated with a second antenna port. See TS36.211 section 6.8A.5, where the first antenna port is termed "Antenna Port 107" and the second antenna port is termed "Antenna port 109".

Note that the "antenna port" concept provides a mapping between beamforming weight vectors (or transmit antennas, depending on the transmit diversity scheme) and the reference symbols (for the case of ePDCCH, the reference symbols are termed DMRS). Therefore, the terminal device can derive a channel estimate based on the "DMRS associated with antenna port 107" and decode the resource elements that are beamformed with antenna port 107 (similarly for antenna port 109). The signals applied to an antenna port are physically transmitted by one or more antenna elements. The beamforming weight vector applied to the antenna port acts to define the amplitude and phase (or in general complex phasor) applied to each antenna element comprising the antenna port. Typically the complex phasor applied to one antenna element of the antenna port is different to the complex phasor applied to the other antenna element of the antenna port.

As would be appreciated, the mapping between beamforming weight vector and antenna port is only valid for a single PRB. Hence in PRB1, antenna port 107 might be associated with beamforming weight vector "W1" whereas in PRB2, antenna port 107 might be associated with beamforming weight vector "W2".

For the distributed mode of operation, because the ePDCCH is composed of multiple EREG, and the EREG can exist in different PRBs, the ePDCCH provides both frequency diversity and beamforming/antenna diversity. This is illustrated in FIG. 6 which shows the resource element mapping for ePDCCH highlighting both frequency diversity and beamforming/antenna diversity.

Figure 6:
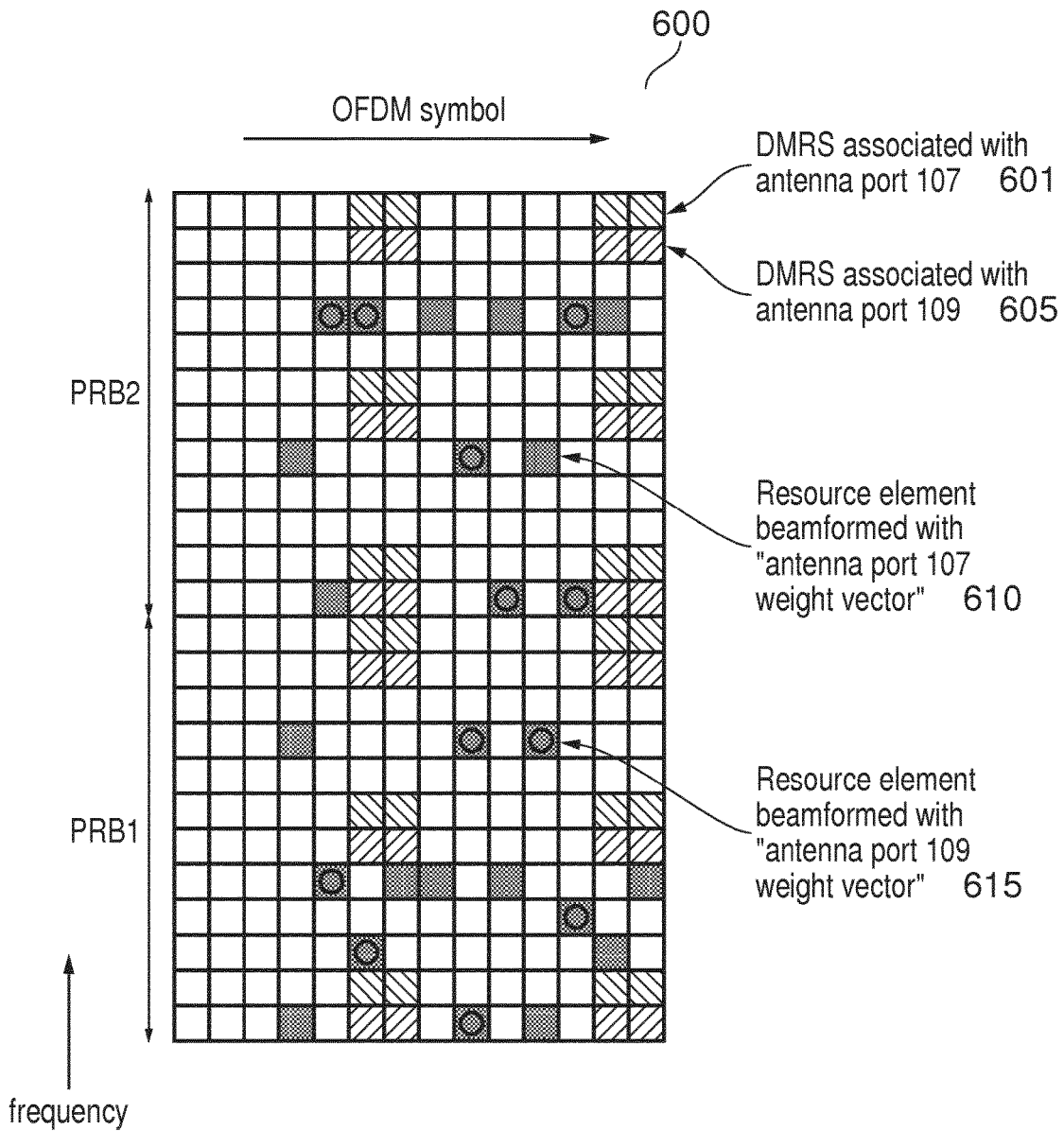
FIG. 6 is schematic representation of two physical resource blocks showing resource mapping for ePDCCH with both frequency and beamforming/antenna diversity.

FIG. 6 shows two consecutive PRBs 600. The block 601 (with line shading extending top left to bottom right) shows the DMRS associated with the first antenna port. Block 605 (with line shading extending top right to bottom left) shows the DMRS associated with the second antenna port. The shaded block 610 shows the resource element beamformed with the first antenna port weight vector applied and the shaded block having a shaded circle therein 615 shows the resource element beamformed with the second antenna port weight vector applied.

Need for ePDCCH to be Decodable without Use of Feedback from the UE

It is known that the ePDCCH has relied on PDCCH operation in order to bootstrap itself thereto. Specifically, the parameters that configure the ePDCCH are sent via RRC signaling and that RRC signaling is transmitted on PDSCH, which in turn is allocated via PDCCH. Therefore, it is known that the ePDCCH requires the PDCCH.

For low complexity devices, such as MTC, low bandwidth operation is desirable. The PDCCH is a wideband control channel (occupying the full LTE system bandwidth). Therefore, the low complexity terminal device will be unable to receive the PDCCH control channel. If the ePDCCH is to be used to support narrow bandwidth (i.e. low complexity) terminal devices, it needs to be able to operate in a standalone mode (i.e. without the need for PDCCH to bootstrap it).

When the ePDCCH operates in standalone mode, it must (at least initially) be decodable by all terminal devices in the cell without prior knowledge of the terminal device's channel conditions at the base station. Once the base station knows the channel conditions of the terminal device, the base station will apply appropriate beamforming codebook weights to optimize communication to that specific terminal device). In order to allow the base station to apply some form of transmit diversity (leading to more robust operation and less fading), the base station can apply random beamforming when distributed ePDCCH transmission is utilized.

When beamforming is applied, a weight vector is applied to a set of antenna elements (sometimes referred to as antennas). If the base station has two antennas, then an example weight vector might be that the transmissions from antenna 1 are multiplied by $$\frac{1}{\sqrt{2}}e^{j\pi/2}$$

and the transmissions from antenna 2 are multiplied by $$\frac{1}{\sqrt{2}}e^{-j\pi/2}.$$

In this case, the beamforming weight vectors applied to the antennas are:

$$\begin{bmatrix} \frac{1}{\sqrt{2}}e^{j\pi/2} \\ \frac{1}{\sqrt{2}}e^{-j\pi/2} \end{bmatrix}.$$

This beamforming weight vector might be assigned to the first antenna port. A different beamforming weight vector, having a similar structure of two complex coefficients in a column vector, might be assigned to the second antenna port. In these cases, the DMRS applied to the first antenna port are also multiplied by the beamforming weight vector.

For the purposes of explanation, simpler weight vectors can be also applied, such as:

$$\begin{bmatrix} 1 \\ 0 \end{bmatrix}.$$

In this case, the transmission occurs just from antenna 1 (the upper row in the vector) and the antenna 2 output is nulled.

Hence, for the sake of simplicity, examples can consider the simplest form of weight vectors for the two antenna ports:

The first antenna port uses weight vector $$\begin{bmatrix} 1 \\ 0 \end{bmatrix}$$

and the second antenna port uses weight vector $$\begin{bmatrix} 0 \\ 1 \end{bmatrix}.$$

This choice of beamforming weight vectors is sometimes referred to as "switched antenna diversity". Referring to FIG. 6, blocks 601 and 610 would be transmitted from antenna 1 and blocks 605 and 615 would be transmitted from antenna 2.

When there are two antenna ports (as for distributed ePDCCH: the first antenna port and the second antenna port), two beamforming weight vectors can be applied. Referring to the simplified "switched antenna diversity" case, resource elements can be switched between the two antennas. However base stations can be implemented with more than 2 antennas, e.g. 4 antennas. Even if all these antennas are not used for ePDCCH, they can be used for other channels (such as PDSCH).

In a distributed ePDCCH, if there is sufficient frequency separation between the PRB pairs, there may not be any benefit from using the full 4 antenna capability of the base station. This is because the channel on the frequency of PRB1 is sufficiently decorrelated from the channel on the frequency of PRB2. Although the above mentions frequency separation, it would be appreciated that it does not matter whether decorrelation on PRB2 is through the frequency domain or through the spatial domain.

However, in a reduced bandwidth system, a distributed ePDCCH may be used where PRB1 is adjacent to PRB2. This is because there is insufficient bandwidth to separate the PRBs substantially in a reduced bandwidth system. In this case, the channel on PRB1 would be correlated with the channel on PRB2 and little frequency diversity would be obtained. This lack of diversity increases fading and is thus undesirable. In this case, it is desirable to employ the full antenna diversity that could be provided by the base station. This increase in spatial diversity counters the increase in fading caused by the small frequency diversity. Hence there are cases where, for the same antenna port, it is desirable to apply different beamforming weight vectors to different antenna elements in different PRBs. This has an effect that the terminal device is not able to average its channel estimates across both PRB1 and PRB2. This is because the terminal device does not know whether the base station is changing the weight vector applied between PRB1 and PRB2.

Figure 7:
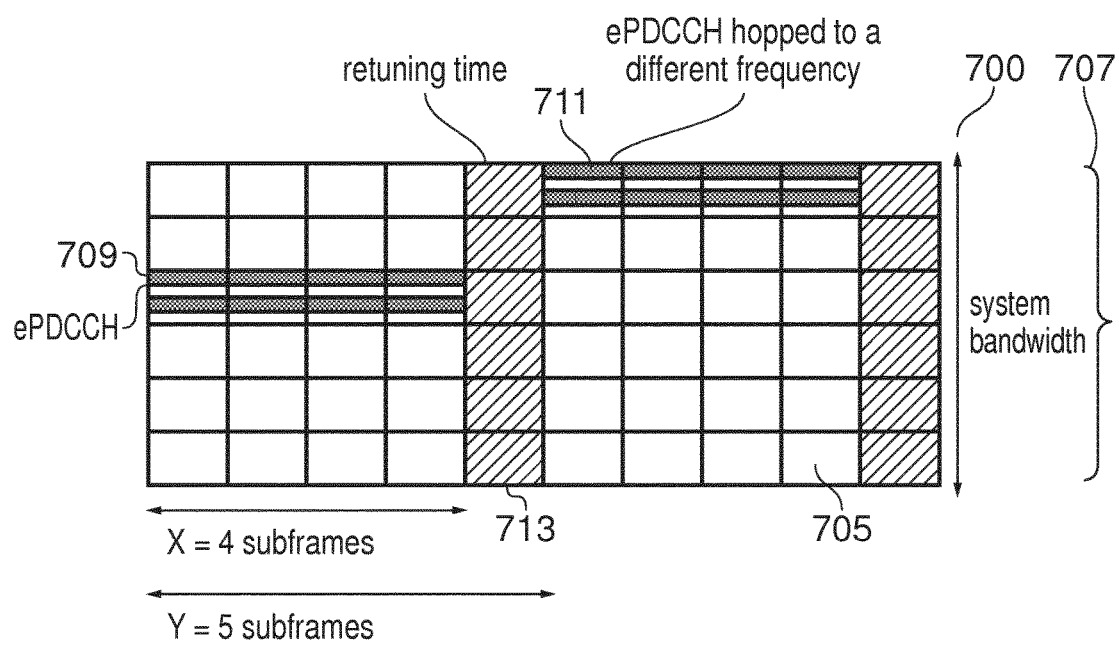
FIG. 7 is schematic representation of the operation of ePDCCH when frequency hopping is applied.

FIG. 7 shows the operation of ePDCCH 709 when frequency hopping is applied. Specifically, a set of 10 LTE subframes 700 of an LTE transmission is shown. The LTE transmission 700 extends across a system bandwidth frequency 707 and is divided into subframes 705. In a coverage extension mode of operation, the ePDCCH can be frequency hopped between subframes as shown in FIG. 7. During the frequency hopping mode of operation, "X" consecutive subframes of ePDCCH are transmitted on a first frequency. In the example of FIG. 7, X is 4 consecutive subframes. Then, the frequency used by the ePDCCH is changed for "Y-X" subframes. In this case, Y is 5 subframes and so the difference is one subframe 713. Then the ePDCCH is transmitted at the new frequency 711. By applying "X" consecutive subframes to ePDCCH, the UE is able to perform cross-subframe channel estimation for "X" consecutive subframes.

A problem arises in the current ePDCCH transmit diversity mode of operation since the terminal device is unable to decode the ePDCCH with maximum reliability since it does not know about the consistency of the channel between PRBs and between subframes.

It is known from R1-120332 "Further Discussion on Reference Signals for E-PDCCH", RIM UK Ltd, RAN1#68 that different beamforming weight vectors can be applied to different eCCEs within an ePDCCH, which allows for random beamforming. However, this document does not teach how the terminal device can perform channel estimates between PRBs.

The present technique aims to address this problem.

In order to address this problem, the base station (eNodeB) applies the same codebook weight vector to each antenna element (sometimes called the "antenna port" or "antenna") for a plurality of physical resource blocks (PRBs) 203. As the skilled person knows a PRB is the smallest unit of bandwidth assigned by the base station scheduler.

Although the same codebook weight vector is applied to the same set of antenna elements comprising an antenna port across a plurality of PRBs, the weight vectors may be consistent between subframes. Alternatively, the codebook weight vectors could change between subframes. Having consistent weight vectors between subframes allows the terminal device to average the channel estimates between subframes in stationary channels. However, changing the weight vectors between subframes can increase the diversity, which combats the effects of fading, when the same signal is repeated from subframe to subframe. When the terminal device knows that the same weight vector is applied to different PRBs, it can operate a channel estimation algorithm that filters or averages the channel estimates between PRBs: for example, the terminal device could perform channel estimation using a minimum mean-squared (MMSE) algorithm, filtering channel estimates among raw channel estimates derived by the terminal device.

The provision to the terminal device of the relationship between weight vectors across PRBs and subframes may be achieved in a number of ways.

Option 1) The terminal device is signalled which antenna ports and/or PRBs have common beamforming weight vectors. Therefore, the terminal device knows which antenna port has common beamforming weight vectors across a plurality of PRBs.

Potential methods of signalling to the terminal device when there is consistency of the beamforming weight vector between PRBs are:

SIB signalling. In this instance, the SIB will be signalled using a known Alamouti-based transmit diversity scheme.

MIB signalling. In this instance, the MIB will be signalled using a known Alamouti-based transmit diversity scheme, for example the 2 transmit antenna port Alamouti scheme defined in 3GPP TS36.211 section 6.3.4.3.

Dedicated signalling to the terminal device. As would be appreciated, the initial stages of transmission to a terminal device might include a known more highly coded robust transmission format, for example through the transmission of more redundant bits (e.g. parity bits) for every information bit transmitted: the amount of redundancy can be varied by varying the rate matching parameters applied to the rate matching function of LTE. This is because the terminal device would not initially know the channel estimation and the consistency of the beamforming weight vectors.

Instead of signalling to the terminal device, the consistency of beamforming weight vectors between PRBs, that information may be fixed in specification.

Figure 8:
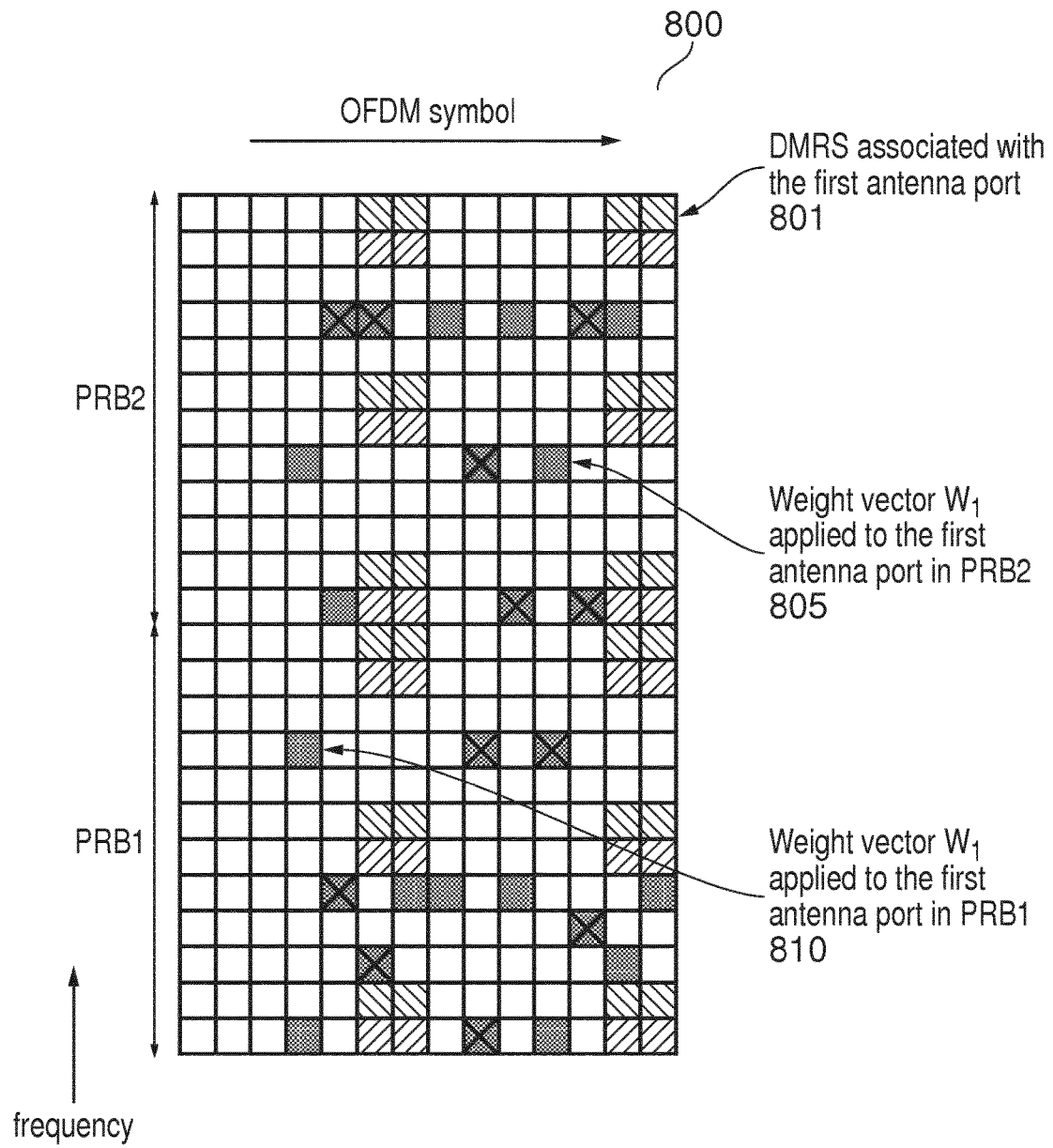
FIG. 8 is a schematic representation of two PRBs to which the same beamforming weight vector is applied to the same antenna port.

Referring to FIG. 8, two consecutive PRBs 800 are shown which indicate the results of the signalling when the same beamforming weight vector is applied to the first antenna port in both consecutive PRBs (PRB1 and PRB2). Block 801 (with dashed line extending from top left to bottom right) shows the DMRS associated with the first antenna port. Block 805 (a shaded empty square in PRB2) shows a resource element that is transmitted using weight vector W1 applied to the first antenna port in PRB2. Block 810 (a shaded empty square in PRB1) shows a resource element that is transmitted using weight vector W1 applied to the first antenna port in PRB1. As can be seen from FIG. 8, the same weight vector is applied to the first antenna port across two PRBs. As noted above, this allows the terminal device to perform channel estimations between PRBs.

Figure 9:
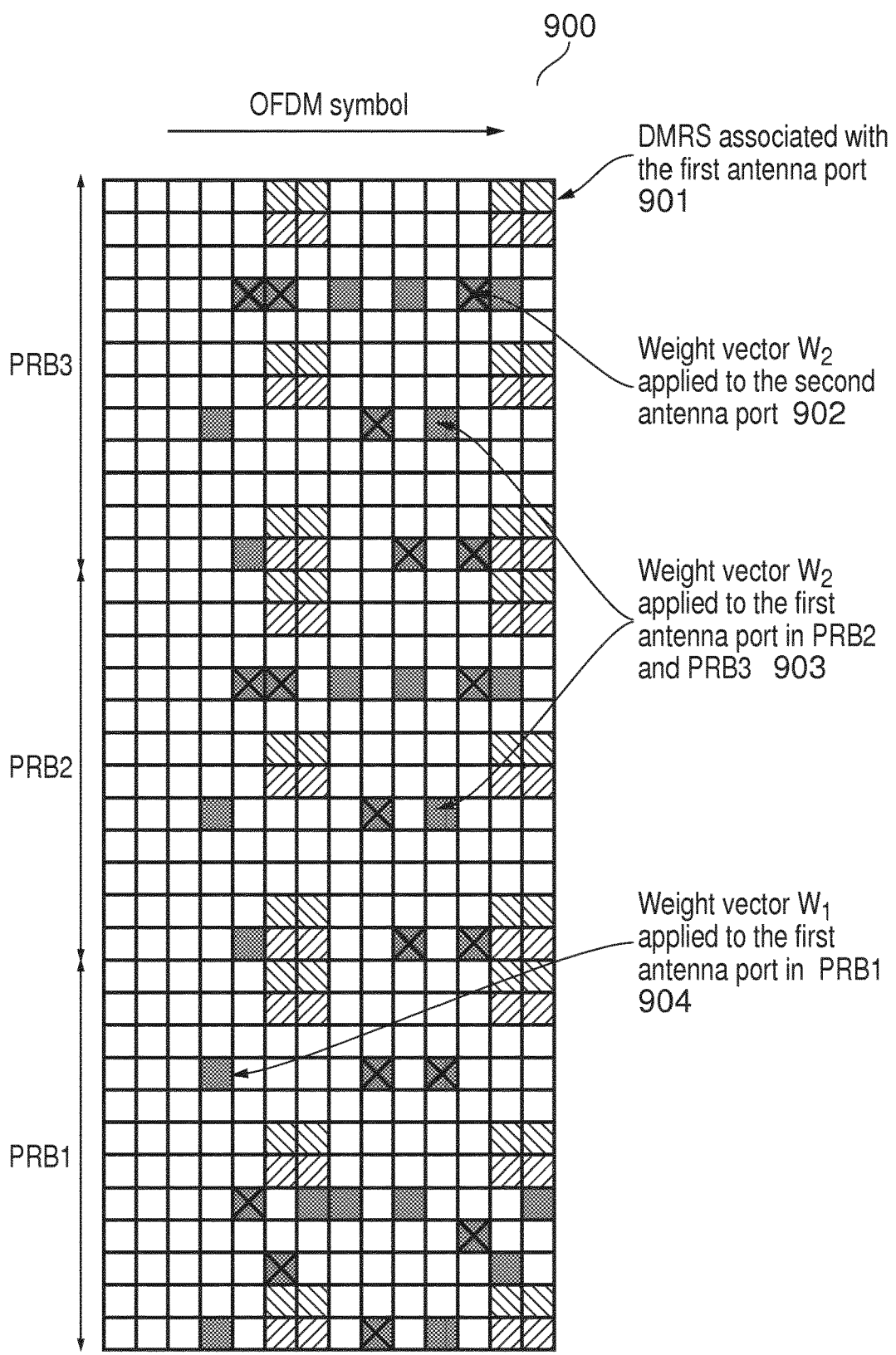
FIG. 9 is schematic representation of three PRBs to which the same beamforming weight is applied to the same antenna element for PRBs 2*n and 2n+1.

Referring to FIG. 9, three consecutive PRBs 900 are shown which indicate the results of the signalling when the same beamforming weight vector is applied to the first antenna port in both PRBs 2*n and 2*n+1. Specifically, in FIG. 9, 2n is PRB2 and 2n+1 is PRB 3. Block 901 (with dashed line extending from top left to bottom right) shows the DMRS associated with the first antenna port. Block 902 (a shaded square with an X located therein in PRB3) shows a resource element that is transmitted using the weight vector W2 applied to the second antenna port in PRB3. This block is not relevant for the purposes of discussion of FIG. 9. Block 903 (shaded empty squares in PRB2 and PRB3) shows a resource element that is transmitted using the weight vector W2 applied to the first antenna port in PRB2 and PRB3. Further, block 904 (a shaded block with a circle located therein in PRB1) shows a resource element that is transmitted using the weight vector W1 applied to the first antenna port in PRB1. As can be seen from FIG. 9, the same weighting vector is applied to the first antenna port across two PRBs (in this case PRB 2n and 2n+1). As noted above, this allows the terminal device to perform channel estimations between PRB s.

With reference to FIGS. 8 and 9 therefore, example signalled information to the terminal device are:

On the first antenna port, the same beamforming weight vector is applied by the base station for both PRB1 and PRB2. This is shown in FIG. 8.

On the first antenna port, PRBs 2*n and 2*n+1 have the same beamforming weight vector applied to them by the base station. This is shown in FIG. 9.

On the first antenna port and the second antenna port, both use the same beamforming weight vector on PRB1.

In order to reduce the information transmitted between the base station and the terminal device, the MIB (or SIB) may signal to the terminal device that the base station is using either "type A", "type B", or "type C" transmissions. The indicator type A, type B or Type C will only use 2 bits and the terminal device will then map the indicated type to an appropriate weight vector arrangement. For example:

type A means "same weight vectors applied to consecutive PRBs"

type B means "same weight vector applied to PRBs 2*n and 2*n+1"

type C means "all PRBs have the same weight vectors applied to them"

This reduces the number of bits used in MIB (or SIB or dedicated channel) to signal the weight vector information. Therefore, data traffic across the network is reduced.

Although the above suggests that the application of consistent weight vectors occurs across all antenna ports, the present technique is not so limited. It is also envisaged, for example, that the signalling could be antenna port specific. In other words, there is a consistency of weighting vectors applied to one antenna port by the base station but another antenna port has no consistency.

Option 2) The base station does not signal the relationship of weight vectors between PRBs to the terminal, but it is always consistent in its application of the weight vectors. There may be a limited number of potential relationships between weight vectors. These relationships may be defined in the specification. For example, the terminal device estimates (without signalling assistance from the base station) which transmission type is used by the base station. This may be achieved in a number of ways. For example:

a) On the first antenna element, the base station applies the same weight vectors on PRB 2*n and 2*n+1 (as shown in FIG. 9), but it does not indicate this information to the terminal device.

b) The base station might use a different scheme for the second antenna port to the scheme used on the first antenna port.

The base station uses weight vectors that change from PRB to PRB on the second antenna port, but uses consistent weight vectors on the first antenna port for PRBs 2*n and 2*n+1.

In this case, the terminal device can signal to the base station whether it prefers the type of mapping applied to the first antenna port or the type of mapping applied to the second antenna port. In the event of this feedback, the base station may store the preference and in the future the base station can consistently apply that type of mapping for that terminal device.

There are various different decoding strategies at the UE:

a) For each antenna port, from subframe to subframe, the terminal device measures whether there is correlation between the reference signals related to that antenna port, for example it measures whether the DMRS 901 in a first subframe is correlated to the DMRS 901 in a second subframe. When the terminal device notices the correlation that is being applied, for example by determining that the correlation value exceeds a threshold, the terminal device will perform future channel estimates on that basis.

b) The terminal device performs blind decoding based on the different potential relationships between channel estimates. The blind decoding that leads to the greatest number of successes then indicates to the terminal device what the terminal device may assume in the future about the consistency of weight vectors applied to the antenna ports. The algorithm which will be performed by the terminal device to achieve this is:

step 1—decode assuming "type A" transmission if failure issue a NACK and decode assuming "type B" transmission. It should be noted that by only attempting to decode "type B" during NACKs, there is no complexity increase, since the terminal device can make an attempt to decode using "type B" rather than be required to decode PDSCH.

Step 2—count number of times that "type B" reception succeeds, but "type A" transmission fails.

Step 3—If number of successful "type B" receptions is greater than the number of "type A" receptions by a certain threshold, assume in the future that the terminal device is using "type B" transmission.

Option 3) When frequency hopping is applied (e.g. between frequencies "f1" and "f2"), the beamforming weight vector is signalled as being consistent for a certain number of subframes during use of frequency "f1", allowing for a change of beamforming weight vectors on "f1". This allows maximum diversity to be achieved on one frequency (f1) before the terminal device is retuned to another frequency (f2). This mode of operation maximises the available diversity while minimising the number of retuning operations. This frequency hopping mode of operation is shown in FIG. 10.

Figure 10:
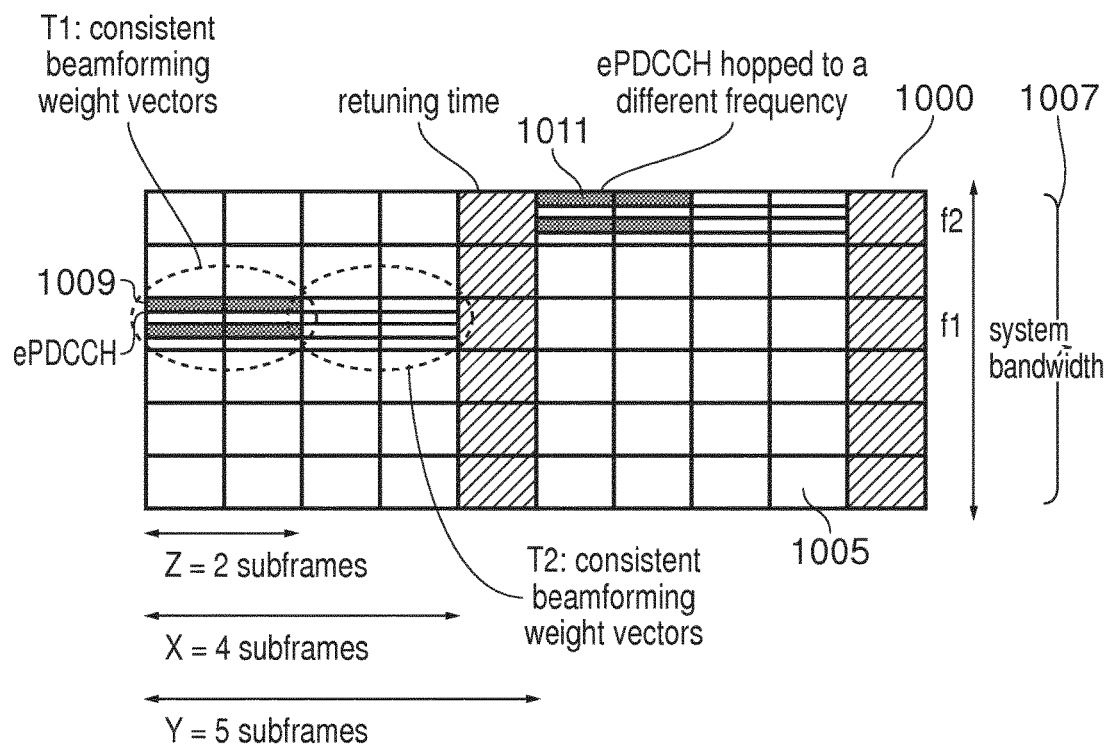
FIG. 10 is schematic representation of the operation of ePDCCH when frequency hopping is applied and the beamforming weight vectors are consistent between a number of subframes.

Referring to FIG. 10, specifically, a set of 10 LTE subframes 1000 of an LTE transmission is shown. The PRB LTE transmission 1000 extends across a system frequency bandwidth 1007 and is divided into subframes 1005. In a coverage extension mode of operation, the ePDCCH can be frequency hopped between subframes as shown in FIG. 10. During the frequency hopping mode of operation, "X" consecutive subframes of ePDCCH are transmitted on a first frequency. In the example of FIG. 10, X is 4 consecutive subframes. The beamforming weight vector set is unchanged for Z=2 subframes and the retuning time (i.e. Y-X subframes) is one subframe. Then the ePDCCH is transmitted at the new frequency (f2) 1011. Again, on the new frequency, the beamforming weight vector set is unchanged for, in this case, 2 subframes (the dark shaded bar).

In FIG. 10, during the Z=2 subframes marked T1, the beamforming weight vectors applied could be:
   The first antenna port having a beamforming weight vector W1
   The second antenna port having a beamforming weight vector W2
During the Z=2 subframes marked T2, the beamforming weight vectors applied could be:
   The first antenna port having a beamforming weight vector W3
   The second antenna port having a beamforming weight vector W4

When the frequency hopped ePDCCH of FIG. 10 is repetition decoded, the physical channel bits that are decoded are diversity across weight vectors W1,W2,W3 and W4 at frequency f1 and also across W1,W2,W3 and W4 at frequency f2. This diversity improves the fading profile of the overall received channel.

The technique described above allows the terminal device to average channel estimates across a larger frequency range than in the prior art. This increases the robustness of the ePDCCH reception by the terminal device. The increased robustness allows the ePDCCH to either be operated at a lower signal to noise ratio, allows more bits to be transmitted on the ePDCCH or allows fewer repetitions to be applied to the ePDCCH (when operated in a coverage enhancement mode).

Figure 11:
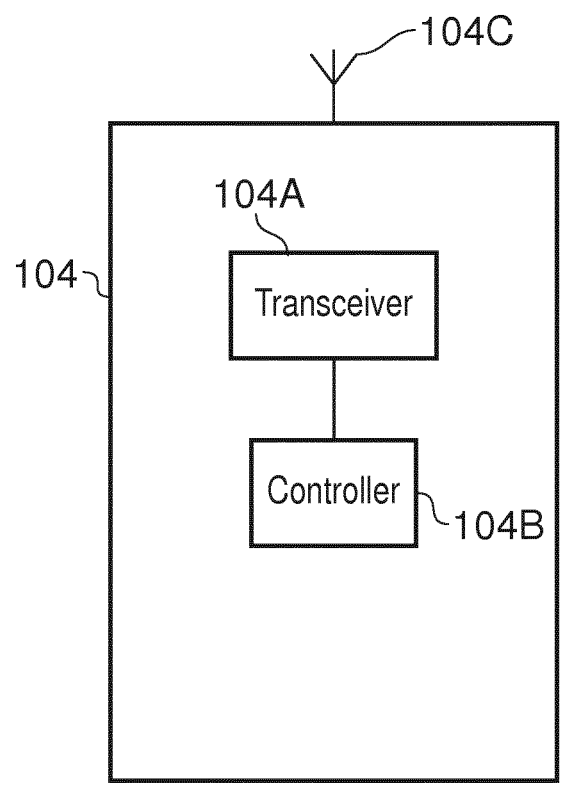
FIG. 11 is a block diagram of a terminal device according to the present technique.

FIG. 11 shows a terminal device 104 according to present techniques. The terminal device 104 comprises a controller 104B. The controller 104B may be circuitry or other functional or software processing units that controls the operation of the terminal device 104. The controller 104B may contain a storage medium whereby software (i.e. computer readable code) may be stored. This software may control the operation of the controller 104B. A transceiver 104A is also provided. The transceiver 104A is controlled by the controller 104B. The transceiver may be circuitry that functionally allows the terminal device to communicate with the wireless network. The transceiver 104A allows the terminal device 104 to transmit and receive data to and from the wireless network. The transmission and/or reception of data using the transceiver 104A is performed through the antenna 104C.

Various further aspects and features of the present invention are defined in the appended claims and various combinations of the features of the dependent claims may be made with those of the independent claims other than the specific combinations recited for the claim dependency. Modifications may also be made to the embodiments hereinbefore described without departing from the scope of the present invention. For instance, although a feature may appear to be described in connection with particular embodiments, one skilled in the art would recognise that various features of the described embodiments may be combined in accordance with the disclosure.

Annex 1:
   The simplified structure of the downlink of an LTE wireless access interface presented in FIG. 2, also includes an illustration of each subframe 201, which comprises a control region 205 for the transmission of control data, a data region 206 for the transmission of user data, reference signals 207 and synchronisation signals which are interspersed in the control and data regions in accordance with a predetermined pattern. The control region 204 may contain a number of physical channels for the transmission of control data, such as a physical downlink control channel (PDCCH), a physical control format indicator channel (PCFICH) and a physical HARQ indicator channel (PHICH). The data region may contain a number of physical channel for the transmission of data, such as a physical downlink communications channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [1].

Resources within the PDSCH may be allocated by an base station to UEs being served by the base station. For example, a number of resource blocks of the PDSCH may be allocated to a UE in order that it may receive data that it has previously requested or data which is being pushed to it by the base station, such as radio resource control (RRC) signalling. In FIG. 2, UE1 has been allocated resources 208 of the data region 206, UE2 resources 209 and UE resources 210. UEs in a an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resource elements, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH. Each uplink subframe may include a plurality of different channels, for example a physical uplink communications channel (PUSCH) 305, a physical uplink control channel (PUCCH) 306, and a physical random access channel (PRACH). The physical Uplink Control Channel (PUCCH) may carry control information such as ACK/NACK to the base station for downlink transmissions, scheduling request indicators (SRI) for UEs wishing to be scheduled uplink resources, and feedback of downlink channel state information (CSI) for example. The PUSCH may carry UE uplink data or some uplink control data. Resources of the PUSCH are granted via PDCCH, such a grant being typically triggered by communicating to the network the amount of data ready to be transmitted in a buffer at the UE. The PRACH may be scheduled in any of the resources of an uplink frame in accordance with a one of a plurality of PRACH patterns that may be signalled to UE in downlink signalling such as system information blocks. As well as physical uplink channels, uplink subframes may also include reference signals. For example, demodulation reference signals (DMRS) 307 and sounding reference signals (SRS) 308 may be present in an uplink subframe where the DMRS occupy the fourth symbol of a slot in which PUSCH is transmitted and are used for decoding of PUCCH and PUSCH data, and where SRS are used for uplink channel estimation at the base station. Further information on the structure and functioning of the physical channels of LTE systems can be found in [1].

In an analogous manner to the resources of the PDSCH, resources of the PUSCH are required to be scheduled or granted by the serving base station and thus if data is to be transmitted by a UE, resources of the PUSCH are required to be granted to the UE by the base station. At a UE, PUSCH resource allocation is achieved by the transmission of a scheduling request or a buffer status report to its serving base station. The scheduling request may be made, when there is insufficient uplink resource for the UE to send a buffer status report, via the transmission of Uplink Control Information (UCI) on the PUCCH when there is no existing PUSCH allocation for the UE, or by transmission directly on the PUSCH when there is an existing PUSCH allocation for the UE. In response to a scheduling request, the base station is configured to allocate a portion of the PUSCH resource to the requesting UE sufficient for transferring a buffer status report and then inform the UE of the buffer status report resource allocation via a DCI in the PDCCH. Once or if the UE has PUSCH resource adequate to send a buffer status report, the buffer status report is sent to the base station and gives the base station information regarding the amount of data in an uplink buffer or buffers at the UE. After receiving the buffer status report, the base station can allocate a portion of the PUSCH resources to the sending UE in order to transmit some of its buffered uplink data and then inform the UE of the resource allocation via a DCI in the PDCCH. For example, presuming a UE has a connection with the base station, the UE will first transmit a PUSCH resource request in the PUCCH in the form of a UCI. The UE will then monitor the PDCCH for an appropriate DCI, extract the details of the PUSCH resource allocation, and transmit uplink data, at first comprising a buffer status report, and/or later comprising a portion of the buffered data, in the allocated resources.

Although similar in structure to downlink subframes, uplink subframes have a different control structure to downlink subframes, in particular the upper 309 and lower 310 subcarriers/frequencies/resource blocks of an uplink subframe are reserved for control signaling rather than the initial symbols of a downlink subframe. Furthermore, although the resource allocation procedure for the downlink and uplink are relatively similar, the actual structure of the resources that may be allocated may vary due to the different characteristics of the OFDM and SC-FDM interfaces that are used in the downlink and uplink respectively. In OFDM each subcarrier is individually modulated and therefore it is not necessary that frequency/subcarrier allocation are contiguous however, in SC-FDM subcarriers are modulation in combination and therefore if efficient use of the available resources are to be made contiguous frequency allocations for each UE are preferable.

As a result of the above described wireless interface structure and operation, one or more UEs may communicate data to one another via a coordinating base station, thus forming a conventional cellular telecommunications system. Although cellular communications system such as those based on the previously released LTE standards have been commercially successful, a number of disadvantages are associated with such centralised systems. For example, if two UEs which are in close proximity wish to communicate with each other, uplink and downlink resources sufficient to convey the data are required. Consequently, two portions of the system's resources are being used to convey a single portion of data. A second disadvantage is that an base station is required if UEs, even when in close proximity, wish to communicate with one another. These limitations may be problematic when the system is experiencing high load or base station coverage is not available, for instance in remote areas or when base stations are not functioning correctly. Overcoming these limitations may increase both the capacity and efficiency of LTE networks but also lead to the creations of new revenue possibilities for LTE network operators.

Features of the present techniques can be generally described in the following numbered paragraphs.

1. An infrastructure equipment for a mobile communications network, the infrastructure equipment comprising,
   a transmitter configured to transmit signals to one or more terminal devices via a wireless access interface comprising a plurality of antenna ports, and
   a controller configured to control the transmitter to transmit the signals to the one or more terminal devices, wherein the transmitter is configured to transmit a plurality of physical resource blocks to the one or more communications devices, wherein a same beamforming weight vector is applied to one of the antenna ports for at least a subset of the plurality of physical resource blocks.

2. An infrastructure equipment according to paragraph 1, wherein the controller is configured to instruct the transmitter to transmit mapping information to the one or more terminal devices, whereby the mapping information informs the terminal device which of the antenna ports and/or physical resource blocks have a common beamforming weight vector.

3. An infrastructure equipment according to paragraph 2, wherein the mapping information is transmitted using one of a master information block or a system information block.

4. An infrastructure equipment according to paragraph 2 or 3, wherein the mapping information is type information.

5. An infrastructure equipment according to paragraph 1, 2, 3 or 4, wherein the controller is configured to control the transmitter to transmit a plurality of physical resource blocks at a first frequency whereby the same beamforming weight vector is applied to the antenna port for a subset of the plurality of physical resource blocks.

6. An infrastructure equipment according to paragraph 5, wherein the controller is configured to control the transmitter to change the frequency from the first frequency to a second frequency and to transmit a further plurality of physical resource blocks at the second frequency.

7. A terminal device used for communicating with a wireless communication network, the terminal device comprising a transceiver configured to receive one or more signals from the wireless communication network via a plurality of antenna ports, and a controller configured to control the transceiver, wherein the signals comprise a plurality of physical resource blocks, wherein a same beamforming weight vector is applied to at least a subset of the received plurality of physical resource blocks.

8. A terminal device according to paragraph 7, wherein the controller is configured to instruct the transceiver to receive mapping information from the wireless communication network, the mapping information informing the terminal device which of the antenna ports in the infrastructure equipment and/or physical resource blocks have a common beamforming weight vector.

9. A terminal device according to paragraph 7, wherein the controller is configured to decode the received physical resource blocks using a first mapping of weight vectors to physical resource blocks on one of the antenna ports and to decode received physical resource blocks using a second mapping of weight vectors to physical resource blocks on a second antenna port and to transmit the preferred mapping to the infrastructure equipment.

10. A terminal device according to paragraph 8, wherein the mapping information is received in one of a master information block or a system information block.

11. A terminal device according to paragraph 8, wherein the mapping information is type information.

12. A terminal device according to paragraph 7 to 11, wherein the controller is configured to control the transceiver to receive a plurality of physical resource blocks at a first frequency whereby the same beamforming weight vector is applied to the antenna port at the infrastructure equipment for a subset of the plurality of physical resource blocks.

13. A terminal device according to paragraph 12, wherein the controller is configured to control the transceiver to change the frequency from the first frequency to a second frequency and to receive a further plurality of physical resource blocks at the second frequency.

14. A method of operating infrastructure equipment for a mobile communications network, the method comprising,
  transmitting signals to one or more terminal devices via a wireless access interface comprising a plurality of antenna ports, and
  wherein the signals comprise a plurality of physical resource blocks and further wherein a same beamforming weight vector is applied to one of the antenna ports for at least a subset of the plurality of physical resource blocks.

15. A method according to paragraph 14, comprising transmitting mapping information to the one or more terminal devices, whereby the mapping information informs the terminal device which of the antenna ports and/or physical resource blocks have a common beamforming weight vector.

16. A method according to paragraph 15, wherein the mapping information is transmitted using one of a master information block or a system information block.

17. A method according to paragraph 15, wherein the mapping information is type information.

18. A method according to paragraph 14 to 17, comprising transmitting a plurality of physical resource blocks at a first frequency whereby the same beamforming weight vector is applied to the antenna port for a subset of the plurality of physical resource blocks.

19. A method according to paragraph 18, comprising changing the frequency from the first frequency to a second frequency and transmitting a further plurality of physical resource blocks at the second frequency.

20. A method of operating a terminal device used for communicating with a wireless communication network, the terminal device comprising a transceiver, wherein the method comprises receiving one or more signals from the wireless communication network via terminal plurality of antenna ports, and wherein the signals comprise a plurality of physical resource blocks, whereby a same beamforming weight vector is applied to at least a subset of the received plurality of physical resource blocks.

21. A method according to paragraph 20, comprising receiving mapping information from the wireless communication network, the mapping information informing the terminal device which of the antenna ports in the infrastructure equipment and/or physical resource blocks have a common beamforming weight vector.

22. A method according to paragraph 20, comprising decoding the received physical resource blocks using a first mapping of weight vectors to physical resource blocks on one of the antenna ports and to decode received physical resource blocks using a second mapping of weight vectors to physical resource blocks on a second antenna port and to transmit the preferred mapping to the infrastructure equipment.

23. A method according to paragraph 21, wherein the mapping information is received in one of a master information block or a system information block.

24. A method according to paragraph 21, wherein the mapping information is type information.

25. A method according to paragraph 20 to 24, comprising receiving a plurality of physical resource blocks at a first frequency whereby the same beamforming weight vector is applied to the antenna port at the infrastructure equipment for a subset of the plurality of physical resource blocks.

26. A method according to paragraph 25, comprising changing the frequency from the first frequency to a second frequency and receiving a further plurality of physical resource blocks at the second frequency.

27. A computer program product comprising computer readable instructions which, when loaded onto a computer, configures the computer to perform a method according to any one of paragraphs 14 to 26.

28. A wireless communication network comprising an infrastructure equipment according to any one of claims 1 to 6 in communication with a terminal device.

29. A wireless communication network comprising a terminal device according to any one of claims 7 to 13 in communication with an infrastructure equipment.

REFERENCES

[1] LTE for UMTS: OFDMA and SC-FDMA Based Radio Access, Harris Holma and Antti Toskala, Wiley 2009, ISBN 978-0-470-99401-6.

[2] "Enhanced Physical Downlink Control Channel in LTE Advanced Release 11". Sigen Ye, Shin Horng Wong, Chandrika Worrall. IEE Communications Magazine, February 2013.

What is claimed is:

1. An infrastructure equipment for a mobile communications network, the infrastructure equipment comprising:
  a transmitter configured to transmit signals to one or more terminal devices via a wireless access interface comprising a plurality of antenna ports; and
  a controller configured to
    control the transmitter to transmit the signals to the one or more terminal devices, wherein the transmitter is configured to transmit a plurality of physical resource blocks to the one or more communications devices, wherein a same beamforming weight vector is applied to one of the antenna ports for at least a subset of the plurality of physical resource blocks; and
    control the transmitter to transmit mapping information to the one or more terminal devices, the mapping information informing the terminal device that a plurality of the antenna ports and/or physical resource blocks have a common beamforming weight vector.

2. The infrastructure equipment according to claim 1, wherein
  the mapping information is transmitted using one of a master information block or a system information block.

3. The infrastructure equipment according to claim 1, wherein
  the mapping information is type information.

4. The infrastructure equipment according to claim 1, wherein
  the controller is configured to control the transmitter to transmit a plurality of physical resource blocks at a first frequency and the same beamforming weight vector is applied to the antenna port for a subset of the plurality of physical resource blocks.

5. The infrastructure equipment according to claim 4, wherein
the controller is configured to control the transmitter to change the frequency from the first frequency to a second frequency and to transmit a further plurality of physical resource blocks at the second frequency.

6. A terminal device used for communicating with a wireless communication network, the terminal device comprising:
a transceiver configured to receive one or more signals from the wireless communication network via a plurality of antenna ports, wherein the signals comprise a plurality of physical resource blocks and a same beamforming weight vector is applied to at least a subset of the received plurality of physical resource blocks; and
a controller configured to instruct the transceiver to receive mapping information from the wireless communication network, the mapping information informing the terminal device that a plurality of the antenna ports and/or physical resource blocks have a common beamforming weight vector.

7. The terminal device according to claim 6, wherein the controller is configured to:
decode the received physical resource blocks using a first mapping of weight vectors to physical resource blocks on one of the antenna ports; and
decode received physical resource blocks using a second mapping of weight vectors to physical resource blocks on a second antenna port; and
transmit the preferred mapping to the wireless communication network.

8. The terminal device according to claim 6, wherein
the mapping information is received in one of a master information block or a system information block.

9. The terminal device according to claim 6, wherein
the mapping information is type information.

10. The terminal device according to claim 6, wherein
the controller is configured to control the transceiver to receive a plurality of physical resource blocks at a first frequency and the same beamforming weight vector is applied to the antenna port for a subset of the plurality of physical resource blocks.

11. The terminal device according to claim 10, wherein
the controller is configured to control the transceiver to change the frequency from the first frequency to a second frequency and to receive a further plurality of physical resource blocks at the second frequency.

12. A method of operating a terminal device used for communicating with a wireless communication network, the terminal device comprising a transceiver, wherein the method comprises:
receiving one or more signals from the wireless communication network via terminal plurality of antenna ports, and wherein the signals comprise a plurality of physical resource blocks, and a same beamforming weight vector is applied to at least a subset of the received plurality of physical resource blocks; and
receiving mapping information from the wireless communication network, the mapping information informing the terminal device that a plurality of the antenna ports and/or physical resource blocks have a common beamforming weight vector.

13. The method according to claim 12, further comprising:
decoding the received physical resource blocks using a first mapping of weight vectors to physical resource blocks on one of the antenna ports;
decoding received physical resource blocks using a second mapping of weight vectors to physical resource blocks on a second antenna port; and
transmitting the preferred mapping to the wireless communication network.

14. The method according to claim 12, wherein
the mapping information is received in one of a master information block or a system information block.

15. The method according to claim 12, wherein
the mapping information is type information.

16. The method according to claim 12, further comprising:
receiving a plurality of physical resource blocks at a first frequency, wherein the same beamforming weight vector is applied to the antenna port for a subset of the plurality of physical resource blocks.

17. The method according to claim 16, further comprising:
changing the frequency from the first frequency to a second frequency and receiving a further plurality of physical resource blocks at the second frequency.

18. The infrastructure equipment according to claim 2, wherein
the mapping information identifies that a same beamforming weight vector is applied to consecutive physical resource blocks.

19. The infrastructure equipment according to claim 2, wherein
the mapping information identifies that all physical resources blocks have a common beamforming weight vector.

20. The infrastructure equipment according to claim 2, wherein
the mapping information is a two bit field configured to signal at least a first type of mapping, a second type of mapping, and a third type of mapping,
the first type of mapping indicating that a same beamforming weight vector is applied to consecutive physical resource blocks,
the second type of mapping indicating that a same beamforming weight vector is applied to at least two specific physical resource blocks, and
the third type of mapping indicating that all physical resources blocks have a common beamforming weight vector.

* * * * *